United States Patent
Peng (10) Patent No.: US 10,963,451 B2
(45) Date of Patent: Mar. 30, 2021

(54) GLOBAL DATABASE DURABLE TRANSACTION CONTROLLING AND SYNCHRONIZATION SYSTEM

(71) Applicant: SAP SE, Walldorf (DE)

(72) Inventor: Yang Peng, Shanghai (CN)

(73) Assignee: SAP SE, Walldorf (DE)

( * ) Notice: Subject to any disclaimer, the term of this patent is extended or adjusted under 35 U.S.C. 154(b) by 167 days.

(21) Appl. No.: 16/218,972

(22) Filed: Dec. 13, 2018

(65) Prior Publication Data

US 2020/0192887 A1  Jun. 18, 2020

(51) Int. Cl.
    *G06F 16/23* (2019.01)
    *G06F 16/25* (2019.01)
    *G06F 16/27* (2019.01)

(52) U.S. Cl.
    CPC ...... *G06F 16/2379* (2019.01); *G06F 16/2308* (2019.01); *G06F 16/2365* (2019.01); *G06F 16/252* (2019.01); *G06F 16/27* (2019.01)

(58) Field of Classification Search
    CPC .... G06F 16/27; G06F 16/2365; G06F 16/252; G06F 16/2308; G06F 16/2379
    USPC ...................................................... 707/703
    See application file for complete search history.

(56) References Cited

U.S. PATENT DOCUMENTS

| | | | |
|---|---|---|---|
| 7,290,056 B1 * | 10/2007 | McLaughlin, Jr. .................... H04L 43/0852 709/201 |
| 7,783,549 B1 * | 8/2010 | Benson .................. G06Q 40/06 705/36 R |
| 8,838,534 B2 * | 9/2014 | Fowler .................. G06F 9/5072 707/615 |
| 2010/0169275 A1 * | 7/2010 | Chen .................... G06F 16/2246 707/610 |

OTHER PUBLICATIONS

Randy Urbano: Oracle Replication Administrator's Guide 12c Release 1 (12.1) E53118—Feb. 2, 2015 (Year: 2015).*

* cited by examiner

*Primary Examiner* — Kuen S Lu (74) *Attorney, Agent, or Firm* — Mintz Levin Cohn Ferris Glovsky and Popeo, P.C.

(57) ABSTRACT

Methods and apparatus, including computer program products, are provided for a distributed database application system. In some implementations, there may be provided a method which may include receiving, by a transaction controller defining a data access layer of a database and via an application server associated with a client interface, a request to modify data stored in the database, the transaction controller comprising an application programming interface (API); establishing, by the API, a virtual connection between the transaction controller and the application server, and a physical connection between the transaction controller and the database; providing, by the API to the application sever via the virtual connection in response to the request, a (Continued)

representation of the data; and executing, by the application server, the request, the executing comprising modifying, via the virtual connection, the representation of the data without modifying the data stored in the database. Related systems, methods, and articles of manufacture are also disclosed.

18 Claims, 5 Drawing Sheets

GLOBAL DATABASE DURABLE TRANSACTION CONTROLLING AND SYNCHRONIZATION SYSTEM

FIELD

The subject matter described herein generally relates to distributed database application systems, and more specifically to query execution and optimizing the synchronization of data stored in databases by one or more application servers via a transaction controller.

BACKGROUND

Distributed database application systems may use distributed transaction management to ensure data write and/or read consistency across databases of each of the systems when multiple transactions occur during a user operation. During the user operation, each application server may perform at least one transaction, requiring the application server to access or modify data stored in one or more databases. All changes to the data may be committed to, or rolled back from, each database, by each separate application server. However, it may be difficult to consistently commit or roll back the changes across multiple databases and/or multiple application servers. It may also be difficult to ensure that any changes made in one database or by one application server are synchronized with any changes made in another database or by another application server. As a result, database application systems may attempt to perform multiple synchronizations or use multiple application protocols to ensure that the data is consistently updated across multiple databases and/or application servers. When a large number of synchronizations take place across multiple databases and/or application servers, a significant amount of data may be modified, thereby causing the synchronizations to be unreliable, fail, or take an unnecessarily large amount of time and computer processing to complete.

SUMMARY

In some implementations, methods and apparatus, including computer program products, are provided for optimizing synchronization of data modifications made by one or more application servers across one or more databases that address the unreliability of synchronizing data and the large amount of time and computer processing required by current systems.

In some implementations, there may be provided a method which may include: receiving, by a transaction controller defining a data access layer of a database and via an application server associated with a client interface, a request to modify data stored in the database. The transaction controller may include an application programming interface (API). The method may further include establishing, by the API, a virtual connection between the transaction controller and the application server, and a physical connection between the transaction controller and the database. The method may also include providing, by the API to the application sever via the virtual connection in response to the request, a representation of the data. The method may further include executing, by the application server, the request. The executing may include modifying, via the virtual connection, the representation of the data without modifying the data stored in the database.

In some variations, one or more of the features disclosed herein including the following features can optionally be included in any feasible combination. The executing may further include: committing, by the application server, the modification to the representation of the data as a single transaction. The committing may include modifying the data stored in the database.

In some examples, the executing may further include canceling, by the application server, the modification to the representation of the data as a single transaction. The canceling may include closing the virtual connection without modifying the data stored in the database.

In other examples, the representation of data is read, by the API, into a data table. The data table may be provided, by the API, to the application server.

In some examples, the method includes receiving by the application server, a request to activate the transaction controller. The method may also include activating, by the application server, the transaction controller as the data access layer on the database.

In other examples, the method may include determining, by the API, that the query comprises a request to modify an amount of data that is greater than a threshold amount. The method may also include creating, by the API, a local streaming copy of the data on the transaction controller. The method may further include streaming, by the API via the virtual connection, the local streaming copy of the data to the application server.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

When practical, similar reference numbers denote similar structures, features, or elements.

DETAILED DESCRIPTION

This document describes a distributed database application system for improving the synchronization of modifications to data made by one or more application servers across one or more databases on a network. The distributed database application system described herein may be particularly helpful when a user operation requires a large amount of data that is stored in multiple databases to be added, deleted, or otherwise modified, and committed to each of the databases, or rolled back from each of the databases (e.g., during an online purchase, during computer software testing, etc.). The distributed database application system may include a transaction controller forming a data access layer over the databases, and that intercepts requests made by the one or more application servers to access or modify data stored in the databases. Any access or modifications to the data may be performed via a virtual connection at the transaction controller, thereby allowing all, or at least some, of the data modifications to be later committed, or rolled back, without making changes to the databases after each transaction. Accordingly, the transaction controller may reduce errors during the synchronization of data, and may reduce the amount of time and processing power required to synchronize data across the databases.

Often, distributed database application systems may use distributed transaction management to ensure data write and/or read consistency across databases of each of the systems when multiple transactions occur during a user operation. For example, during a user operation (e.g., an online purchase, software testing, etc.), one or more application servers may perform multiple transactions and/or need to access, or modify data (e.g., add, revise, remove data) stored in one or more databases. In such situations, the changes to the data may be committed to, or rolled back from, each database, by each application server. However, it may be difficult to consistently commit or roll back the changes to the data stored in the databases across multiple databases and/or multiple application servers.

In some situations, when the database application systems receive a query to complete a transaction that includes a request to access or modify data, one or more application servers may receive the query or different portions of the query. Each application server may access (e.g., use, modify, etc.) data stored in more than one data table or more than one database. Thus, it may be difficult to ensure that any changes made in one database or by one application server, are synchronized with any changes made in another database or by another application server each time a transaction occurs.

As a result, database application systems may attempt to perform multiple synchronizations or use multiple application protocols to ensure that the data is consistently updated across multiple databases and/or application servers. When a large number of synchronizations take place across multiple databases and/or application servers, a significant amount of data may be modified, thereby causing synchronizations to be unreliable, fail, and/or take an unnecessarily large amount of time and computer processing to complete.

In one example of a user transaction, such as an online purchase made by a user, the user may select goods, create an order, and pay for the selected goods. Thus, the online purchase involves data received from multiple requests or transactions (e.g., goods selection, order creation, payment information, etc.) in a single operation. Each request may be associated with a different application server, such that a different application server may write, read, and/or modify data when each the application server receives a request.

In this example, a first application server may write, read, and/or modify data stored in a database when the first application server receives the user's selection of goods, a second application server may add, access and/or modify data stored in the same or different database when the second application server receives the user's request to create an order, and a third application server may write, read, and/or modify data stored in the same or different database when the third application server receives a request to pay for the selected goods and receives payment information entered by the user via the client. When the user enters information or makes a selection, at least some data is written to, read from, and/or modified in the database by each of the three different application servers.

Problems in this example may occur when there is a system failure, such as when the payment fails, an item is out of stock, or another system failure. When such situations occur, the order may be canceled or adjusted, and the data added, accessed, and/or modified may be rolled back to the data's original state. However, since multiple application servers were used to write, read, and/or modify the data, rolling back the changes may be cumbersome and time consuming. It may also be difficult to roll back the changes to the data when a large number of application servers are used to handle a large number of requests.

A system consistent with implementations of the current subject matter may provide a transaction controller that helps to consistently and quickly roll back data that has been written, read, and/or modified consistently across each of the application servers, as a single transaction. For example, the transaction controller may allow the data written, read, and/or modified by the multiple application servers to be temporarily stored or manipulated via a virtual connection between the application server and the transaction controller, so that the changes to the data may be removed as a single transaction (rather than multiple transactions associated with each application server) without making any changes to the database.

In another example, a developer may analyze, test, debug code, and the like, for a customer. As part of the analysis, the developer may perform one or more operations that include one or more requests (in some cases, a large number of requests), each of which may read, write, and/or modify data stored in the customer's database. As mentioned above, each of the requests may be handled by different application servers in communication with the client interface. When the developer's analysis is complete, the developer may want to roll back any changes made to the database during the analysis, testing, debugging, etc.

However, it may be difficult to consistently roll back the changes made to the database across the multiple different application servers that committed the changes. For example, to return the data stored in the database to the data's original state, the data may need to be manually changed back to the original state, which becomes increasingly more difficult and complex with a large number of requests/application servers. A system consistent with implementations of the current subject matter may provide a transaction controller that helps to consistently and quickly roll back data that has been written, read, and/or modified consistently across each of the application servers, as a single transaction.

In some implementations, a distributed database synchronization system may include a transaction controller, consistent with implementations of the current subject matter, that communicates with multiple application servers. The transaction controller may communicate with a database server and provide a virtual connection to communicate with the multiple application servers.

The virtual connection between the transaction controller and the multiple application servers may allow for data from the database server to be read, written, and/or modified (e.g., temporarily manipulated) without altering the data physically stored in the database, thereby speeding up the process for rolling back changes to data. The transaction controller may ease data rollback as the transaction controller provides a central interface that is in communication with each of the different application servers, rather than rolling back data through a fragmented approach.

Figure 1:
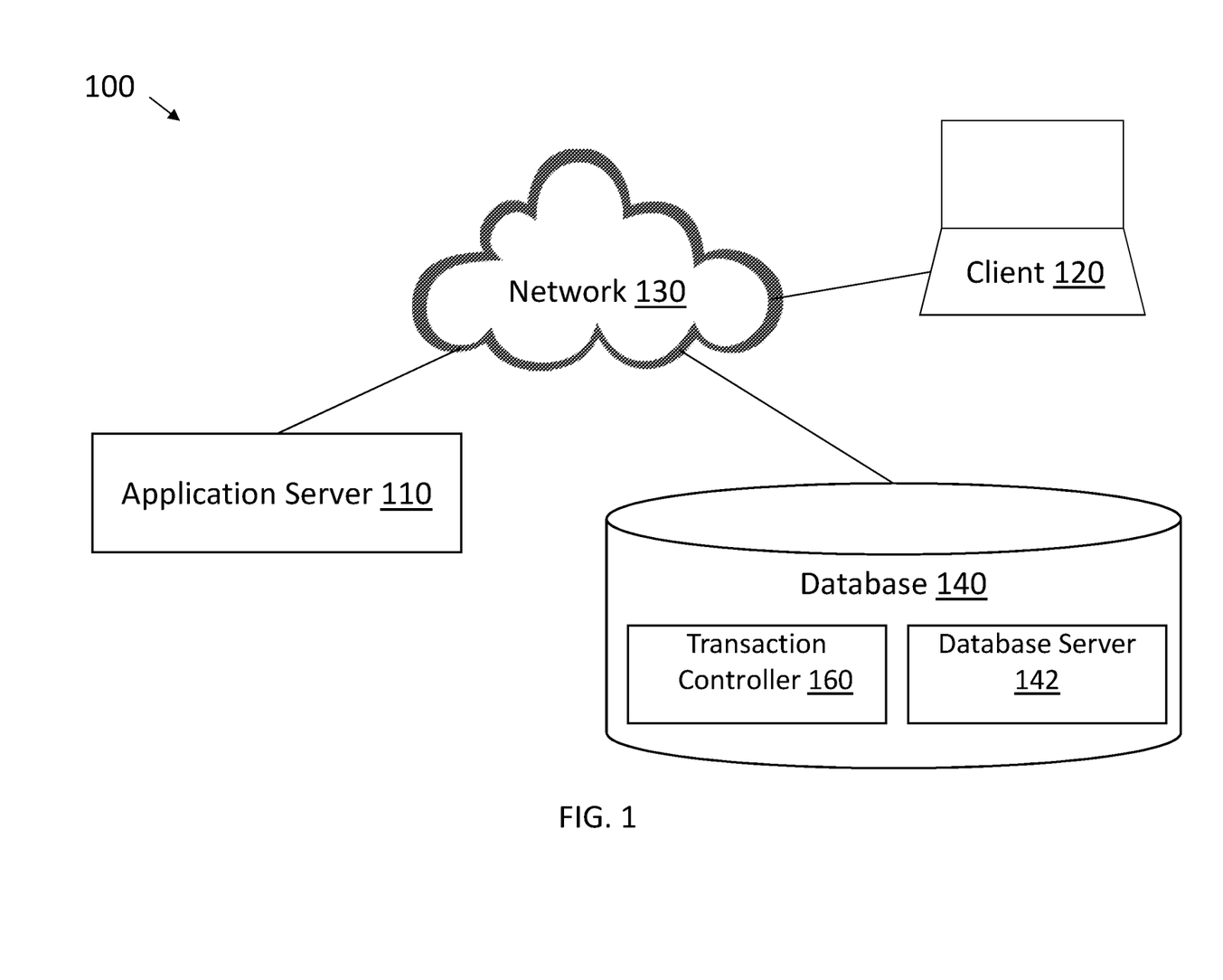
FIG. 1 illustrates an example of a distributed database application system, consistent with some example implementations.

FIG. 1 depicts a network block diagram illustrating a distributed database system 100, consistent with some implementations of the current subject matter. The distributed database system 100 may include an application server 110, one or more clients 120, a database 140, and a wired and/or wireless network 130. The application server 110 may interact with various features of the distributed database system 100, such as the one or more clients 120 and the database 140, to access and/or modify data during a user operation.

During execution of a query or a user operation, the application server 110 may execute a transaction or a request to access and/or modify data (e.g., any kind of data, including transactional data, metadata, timestamp data, lock data, access data, master data, and/or the like) stored in one or more databases 140, which may include a database management system (DBMS) that is coupled with an in-memory database, a relational database, and/or any other types of persistence, and may support a variety of database operations for accessing the data records held in the database including, for example, structured query language (SQL) queries and/or the like. Execution of the transaction may require access to the DBMS to read, write, and/or modify data records held in the one or more databases 140. For example, each transaction may include multiple requests (e.g., sequential or non-sequential) to be executed by the one or more application servers 110, to read, write, and/or modify the data records stored in the one or more databases 140.

The database 140 may include a database server 142 and a transaction controller 160 in communication with the database server 142. The transaction controller 160 may form a data access layer over the one or more databases 140. The transaction controller 160 may intercept the requests made by the one or more application servers to access and/or modify the data records stored in the one or more databases 140. The transaction controller 160 may include at least one application program interface (API), which may be executed by the distributed database application system (e.g., computing system). The API of the transaction controller 160 may establish a virtual connection at the transaction controller with the one or more application servers 110. The transaction controller 160, such as via the API, may allow the requesting application servers 110 to access and/or manipulate representations (e.g., textual representations) of the data records stored in the one or more databases 140, rather than the physical data stored in the one or more databases 140, thereby allowing all, or at least some, of the data modifications to be later committed, or rolled back, without making changes to the databases 110 after each transaction executed by the application servers 110.

Referring to FIG. 1, the one or more clients 120 may be any device that includes at least one processor and at least one memory including program code. For example, the client 120 may be a computer, a tablet, a mobile device, a smart phone, and/or a wearable device. The client 120 may be any data collection device configured with network connectivity. In some implementations, the client 120 may receive code or other software from a user via a display screen. For example, the user may send a request to perform a user operation (e.g., make an online purchase, test code, etc.) via the client 120. The client 120 may receive one or more instructions and/or commands from the user for executing the user operation. The client 120 may further receive one or more instructions and/or commands, submitted via the display screen, to request to execute the user operation via the client 120.

The application server 110 may be communicatively coupled with the one or more clients 120, and/or the database 140 via the wired and/or wireless network 130. The wired and/or wireless network 130 may be a public land mobile network (PLMN), a local area network (LAN), a virtual local area network (VLAN), a wide area network (WAN), a point-to-point link, the Internet, and/or the like.

Figure 2:
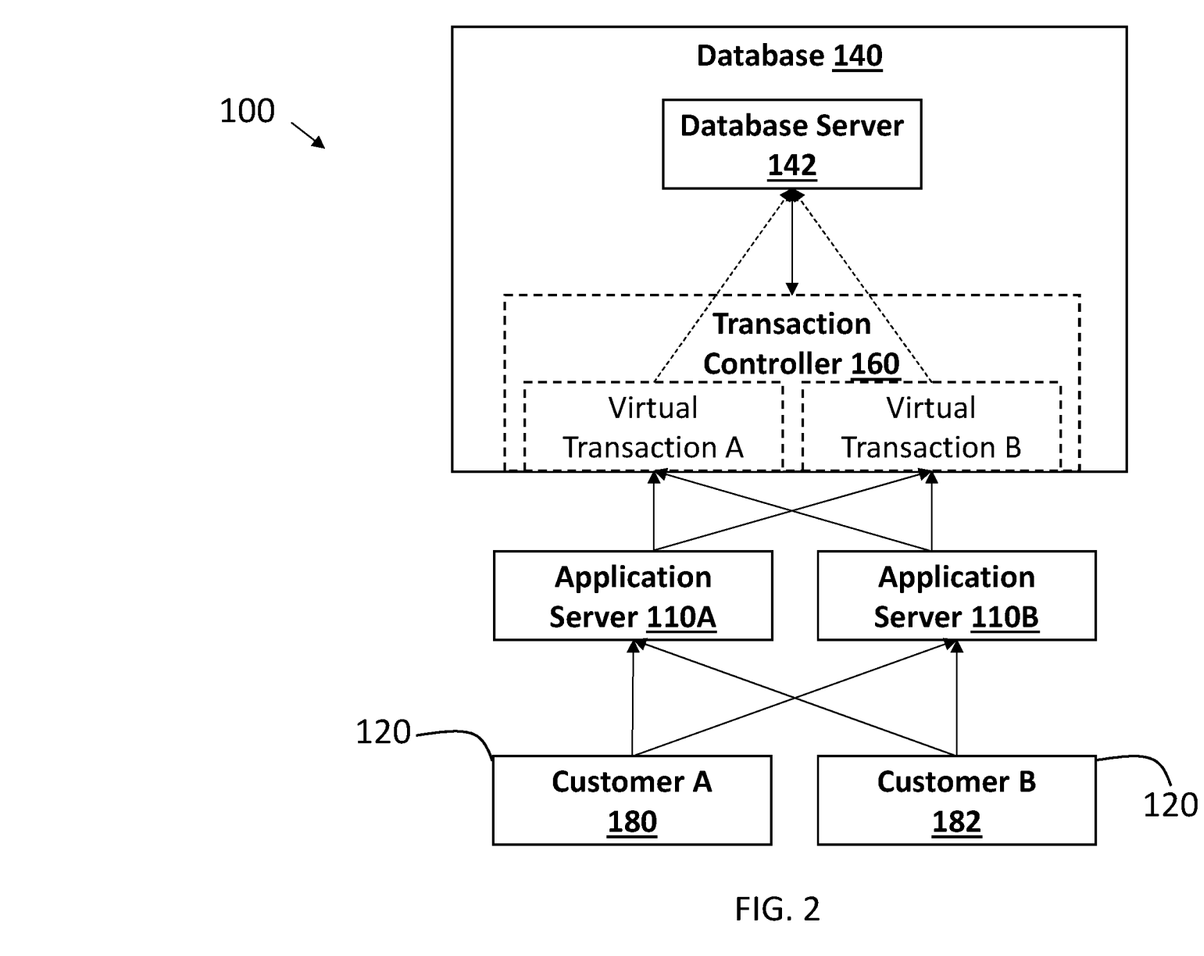
FIG. 2 illustrates a detailed system diagram illustrating a transaction controller of a distributed database system consistent with some implementations of the current subject matter.
Figure 3:
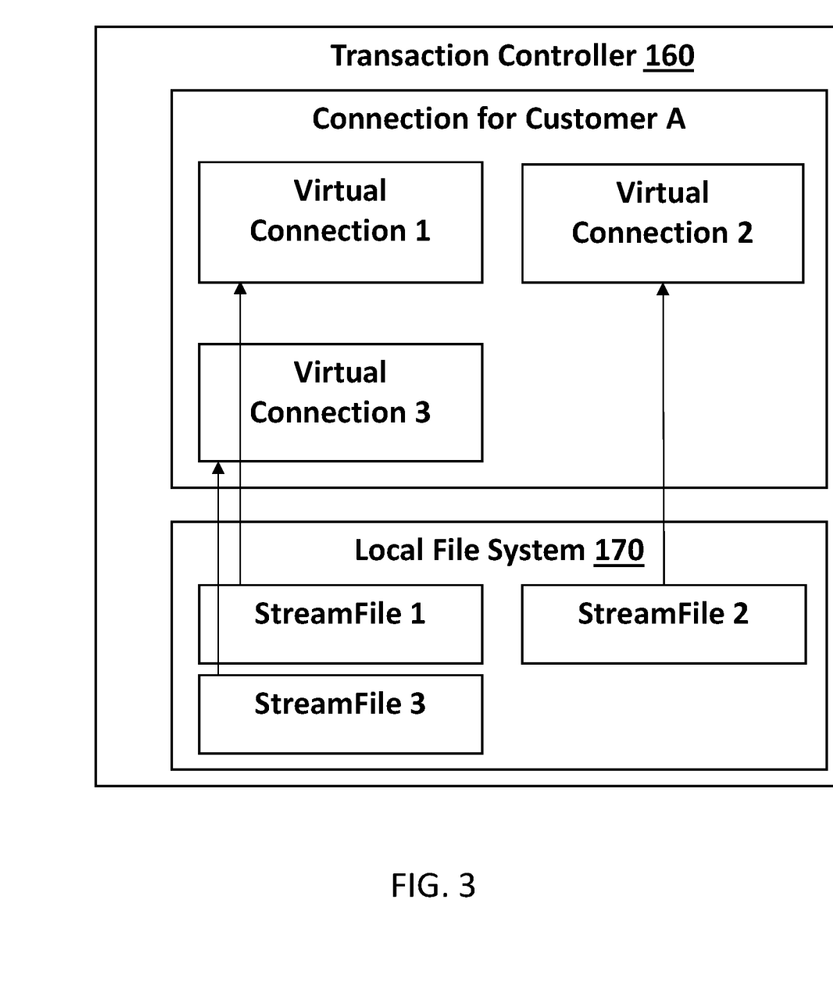
FIG. 3 illustrates an example of a transaction controller, consistent with some example implementations.

FIG. 2 depicts a block diagram illustrating an example of the transaction controller 160 communicatively coupled with the database server 142 of the database 140 and first and second application servers 110. Each of the first and second application servers 110A, 110B may receive and/or execute a query (e.g., a transaction or part of a transaction), which includes a request to access and/or modify data stored in the database 140. The query may be initiated by a user, such as customer A 180 and/or a customer B 182, such as via the one or more clients 120.

As noted above, the transaction controller 160 may intercept the request to access and/or modify data stored in the databases 140, and establish a physical connection with the one or more databases 140, such as via the database server 142, and a virtual connection with the one or more application servers 110. For example, the transaction controller 160 may include at least one application programming interface (API). The API may establish the physical connection with the one or more databases 140 and/or the virtual connection with the one or more application servers 110 to provide a representation (e.g., a textual representation) of the data stored in the one or more databases 140. In some implementations, the transaction controller 160 may establish a physical connection with a database 140, and establish multiple virtual connections with one or more application servers 110, such as application servers 110A, 110B.

The first and/or second application servers 110A, 110B may execute the query by, for example, modifying the representation of the data (e.g., via the virtual connection), without modifying the data stored (e.g., physically stored) in the database. The transaction controller 160 allows all, or at least some, of the data modifications to be later committed to the one or more databases 150, or rolled back, without making changes to the databases 140 after each transaction executed by the application servers 110A, 110B, while allowing for consistency across the one or more databases 140. Thus, the transactions may define virtual transactions (e.g., Virtual Transaction A and Virtual Transaction B shown in FIG. 2), that may not alter the data physically stored in the one or more databases 140.

Referring to the first example noted above, in which a user begins to make an online purchase, the user may select goods, create an order, and pay for the selected goods. Thus, the online purchase involves data received from multiple requests or transactions (e.g., goods selection, order creation, payment information, etc.) in a single user operation or query. Each request may be associated with a different application server, such that a different application server may write, read, and/or modify data when each the application server receives a request.

In this example, as shown in FIG. 2, each of the requests (e.g., good selection, order creation, payment, etc.) may be received by one or more of application servers 110A, 110B, via the client 120. For example, a user may (1) select a good via the client 120, (2) create an order via the client 120, and (3) enter their payment information via the client 120. The application servers 110A, 110B, etc., would execute each of steps (1), (2), and (3). As part of executing each of the steps (1), (2), and (3), the application servers 110A, 110B may need to access and/or modify data stored in the one or more databases 150.

Rather than read, write, and/or modify data stored in one or more databases 140, the application servers 110A, 110B may execute each of the steps (1), (2), and (3) by reading, writing, and/or modifying representations of the data stored in the one or more databases 140 provided by API on the transaction controller via the virtual connection established between the transaction controller 160 and the application servers 110A, 110B. In this case, the application servers 110A, 110B would not read, write, and/or modify the data physically stored in the one or more databases 140. For example, the transaction controller 160 may establish a physical connection with the databases 140 and a virtual connection with the first and second application servers 110A, 110B. The transaction controller 160 may intercept the request to read, write and/or modify data. Rather than allowing the application servers 110A, 110B to read, write, and/or modify the data physically stored in the databases 140 after each of steps (1), (2), and (3), the transaction controller 160 provides representations of the data that may be accessed and/or modified by the first and second application servers 110A, 110B via the virtual connection.

In some implementations, such as when the user cancels the online order before the order is completed, a failure occurs during payment, and the like, all changes to the data would need to be rolled back and/or deleted from the one or more databases 150. Rolling back or deleting all of the data associated with the online purchase may be difficult when there are many data entries, the data is written to multiple databases, multiple application servers execute the requests, etc. The transaction controller 160 consistent with implementations of the current subject matter would allow the accessed and/or modified representations of the data (which are provided by the transaction controller 160) to be deleted, without making any changes to the one or more databases 140. For example, the data received via the client when the user (1) selects a good, (2) creates an order, and/or (3) enters payment information would be rolled back or deleted as a single transaction, and without making any changes to the physical database 140. In such implementations, the transaction controller 160 allows for improved consistency, speed, and performance, in data synchronization during a user operation across one or more application servers, one or more requests, one or more databases, etc.

In the second example noted above, a developer may analyze, test, debug code, and the like, for customer A 180 and/or customer B 182. As part of the analysis, the developer may perform one or more operations via the client 120 that include one or more queries to be executed by the first and second application servers 110A, 110B. In some cases, the queries may include a large number of requests, each of which may read, write, and/or modify data stored in the customer's database. The transaction controller 160 may intercept the requests to read, write, and/or modify the data stored in the customer's database, and provide representations of the data that may be read, written, and/or modified by the first and second application servers 110A, 110B, via a virtual connection between the transaction controller 160 and the first and second application servers 110A, 110B.

When the developer's analysis is complete, the developer may want to roll back or delete all data read, written to, and/or modified during the analysis, testing, debugging, etc. The transaction controller 160 allows for improved consistency, speed, and performance, in data synchronization during the user operation across one or more application servers, one or more requests, one or more databases, etc., as the transaction controller 160 allows all of the representations of data read, written to, and/or modified during the analysis, testing, debugging, etc. to be rolled back as a single transaction.

In some implementations, the application server 110 may execute a request to access and/or modify an amount of data that is greater than or equal to a threshold amount, such as greater than 1 million data records. When the application server 110 executes a request to access and/or modify the large amount of data, the transaction controller 160 may create a temporary local copy of the data as a local streaming file at the transaction controller in a local file system 170. The local streaming file (e.g., StreamFile 1, StreamFile 2, StreamFile 3 shown in FIG. 2) may be virtually streamed, via the transaction controller 160, to the application server 110 via one or more virtual connections (e.g., Virtual Connection 1, Virtual Connection 2, Virtual Connection 3 shown in FIG. 2). The virtual stream acts as a locally streamed object, which may be accessed and/or modified by the application server 110. Virtually streaming the data as one or more local streaming files temporarily stored in the local file system 170 may increase the speed at which the data is provided to the application server 110 for access and/or modification. When the application server 110 completes execution of the requests, all of the modifications made to the local streaming files may be committed to the database 140 via the physical connection between the transaction controller 160 and the database 140 and/or be deleted as a single transaction when the virtual connection is closed. The transaction controller 160 allows for improved consistency, speed, and performance, in data synchronization during the user operation across one or more application servers, one or more requests, one or more databases, etc., as the transaction controller 160 allows all of the local streaming files containing data read, written to, and/or modified to be committed or rolled back as a single transaction.

Figure 4:
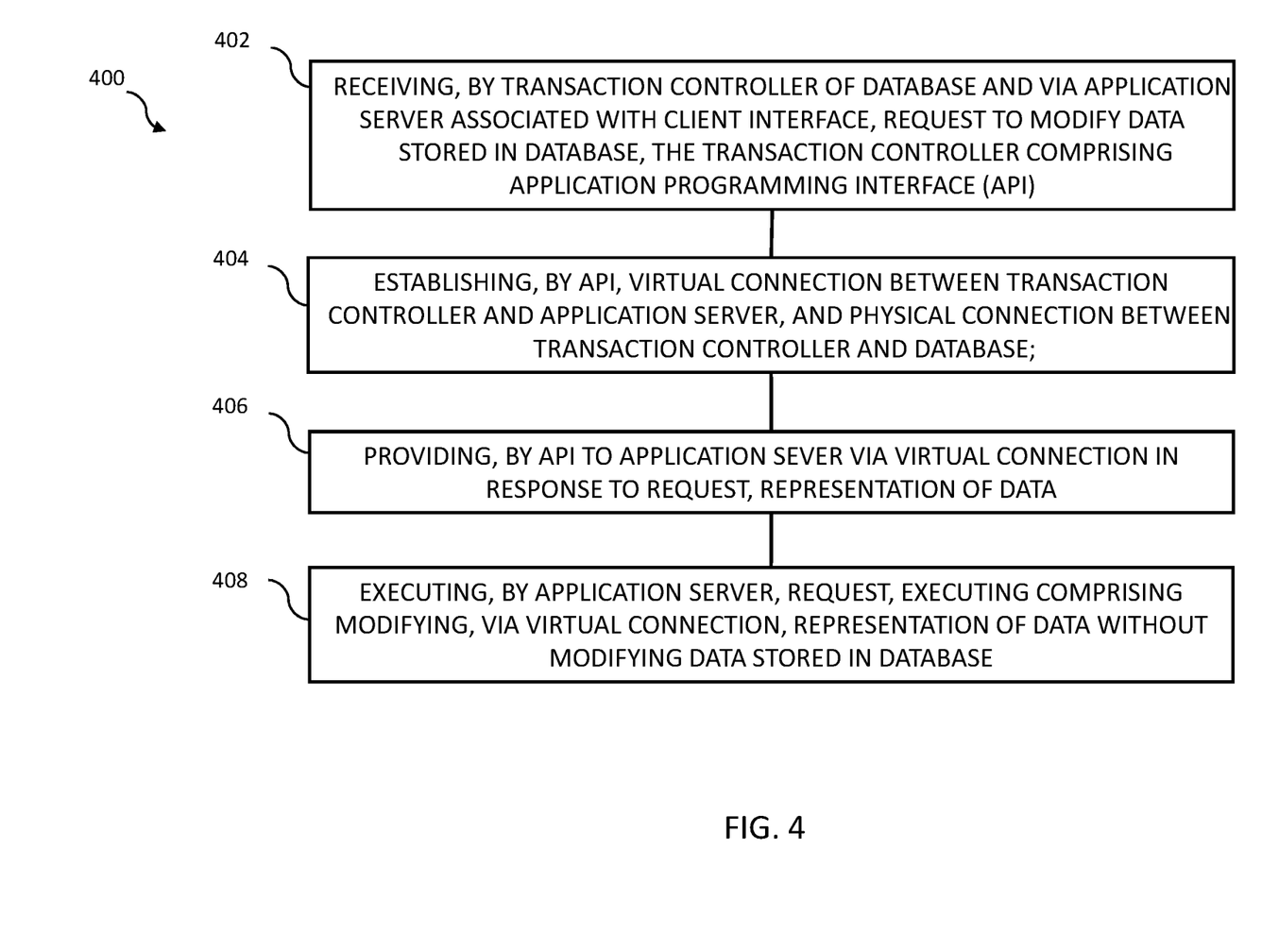
FIG. 4 depicts a flowchart illustrating a process for optimizing synchronization of data consistent with some implementations of the current subject matter.

FIG. 4 depicts a flowchart illustrating a process 400 for optimizing synchronization of data consistent with some implementations of the current subject matter.

An application server, such as the application server 110 or application servers 110A, 110B, may execute a request received via the client 120, to activate a transaction controller (e.g., a data access layer on a database), such as the transaction controller 160. In some implementations, the transaction controller may be executed automatically, manually, via API-based flagging, and the like.

In some implementations, the application server may execute a request to modify and/or access data stored in a database. In some implementations, such as when the transaction controller is activated, the transaction controller may intercept the request made by the application server to modify and/or access the data. For example, at 402, the transaction controller (e.g., the transaction controller 160) may receive, via the application server (e.g., the application server 110) associated with a client interface (e.g., client 120), a request to read, write, access and/or otherwise modify data stored in a database (e.g., the database 140). In some implementations, the application server may call a statement (e.g., getPreparedStatement, statement.executeQuery, and the like) to the transaction controller, and may track SQL parameters. The transaction controller 160 may include an API (e.g., one, two, three, etc. APIs), such as a REST API, which may communicate with the database and the application server.

At 404, the API may establish a virtual connection between the transaction controller and the application server. The API may also establish a physical connection between the transaction controller and the database. In some implementations, the virtual connection may directly call the API of the transaction controller by executing the following query: /db/connection/new to allocate the remote virtual connection. The virtual connection may additionally or alternatively call the API of the transaction controller by executing the following query: /db/connection/new(customerid) to create a virtual connection with connection ID for tracking. In some implementations, the API of the transaction controller may check if the physical connection exists, and allocate a virtual connection under the physical connection.

At 406, the API may provide a representation of the data to the application server via the virtual connection. For example, the API may provide a representation of the requested data in the form of one or more data tables or counts. The data may be wrapped into a virtual table (e.g., RecordSet) and/or return count and be sent to the application server via the virtual connection. In some implementations, the transaction controller will simply provide return affected count to the application server. In some implementations, the transaction controller may read all data records into a data table and return the data table to the application server.

In some implementations, the data includes a large amount of data, such a Binary Large Object field. In such implementations, the transaction controller may write the data and/or store a temporary copy locally on the transaction controller. The application server may read the binary large object field, via the virtual connection, as a virtual streaming object, that acts as a local streaming object, as noted above.

At 408, the application server may execute the request by, for example, accessing and/or otherwise modifying the representation of data via the virtual connection without modifying the physical data stored in the database. The modified representation of data may be later committed to the database as a single transaction and/or rolled back/cancelled as a single transaction, thereby improving data synchronization speed and consistency. Once all of the representations of data have been read, written, and/or processed, the virtual connection may be terminated. In some implementations, when the application server terminates the virtual connection, the application server calls the following: /db/connection/return(connectionId). In some implementations when the application server rolls back/cancels the modified representation of data, the application server calls the following: /db/connection/delete(customerid). When the data representation roll back/cancellation is executed, the transaction controller will remove all resources associated with the virtual connection and/or connection IDs.

Accordingly, the transaction controller allows for improved consistency, speed, and performance in data synchronization during user operations across one or more application servers, one or more requests, one or more databases, etc., as the transaction controller allows all data read, written to, and/or modified to be committed or rolled back as a single transaction.

Figure 5:
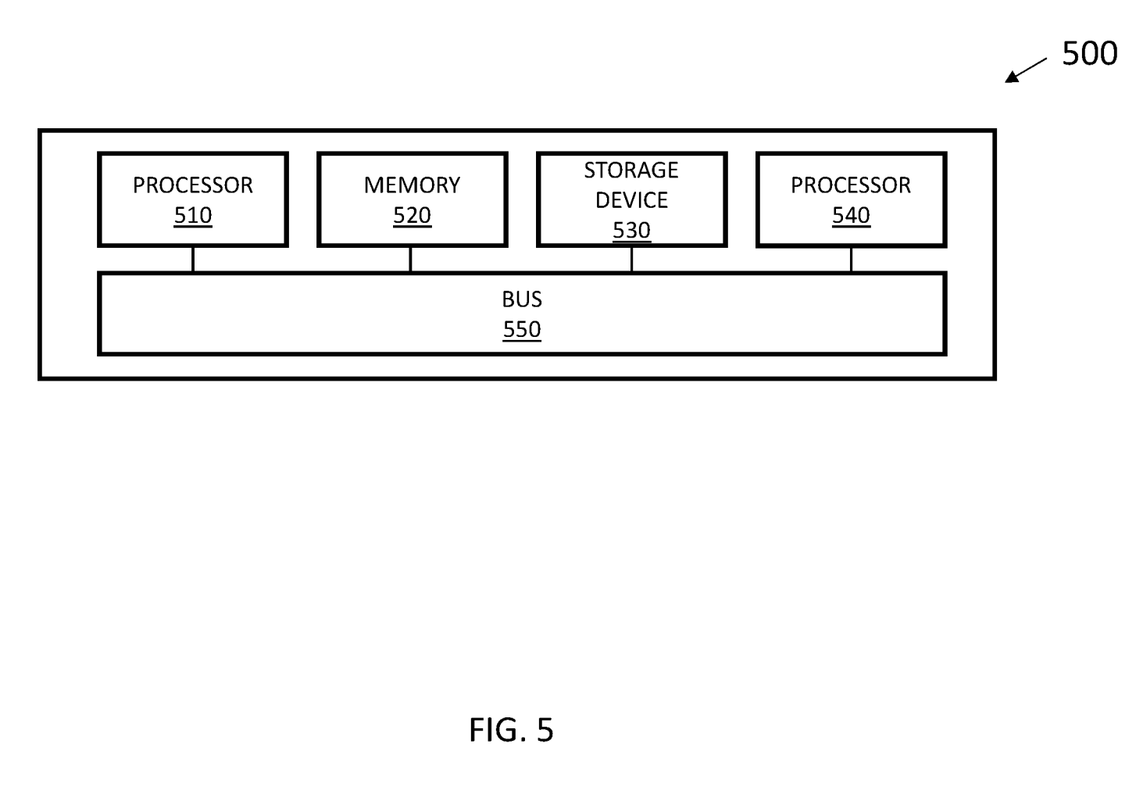
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1 and 5, the computing system 500 may be used with the distributed database application system 100 and/or any components therein.

As shown in FIG. 5, the computing system 500 may include a processor 510, a memory 520, a storage device 530, and input/output devices 540. The processor 510, the memory 520, the storage device 530, and the input/output devices 540 may be interconnected via a system bus 550. The processor 510 is capable of processing instructions for execution within the computing system 500. The executed instructions may implement one or more components of, for example, the distributed database application system 100. In some implementations of the current subject matter, the processor 510 may be a single-threaded processor. Alternately, the processor 510 may be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 may store data structures representing configuration object databases, for example. The storage device 530 is capable of providing persistent storage for the computing system 500. The storage device 530 may be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

Consistent with some implementations of the current subject matter, the input/output device 540 may provide input/output operations for a network device. For example, the input/output device 540 may include Ethernet ports or other networking ports to communicate with one or more wired and/or wireless networks (e.g., a local area network (LAN), a wide area network (WAN), the Internet).

In some implementations of the current subject matter, the computing system 500 may be used to execute various interactive computer software applications that may be used for organization, analysis and/or storage of data in various formats. Alternatively, the computing system 500 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities (e.g., add-ins for a spreadsheet and/or other type of program) or may be standalone computing products and/or functionalities. Upon activation within the applications, the functionalities may be used to generate the user interface provided via the input/output device 540. The user interface may be generated and presented to a user by the computing system 500 (e.g., on a computer screen monitor, etc.).

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store the machine instructions non-transitorily, such as for example as would a non-transient solid-state memory or a magnetic hard drive or any equivalent storage medium. The machine-readable medium may alternatively or additionally store the machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, the phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A system, comprising:
   at least one data processor; and
   at least one memory storing instructions, which, when executed by the at least one data processor, cause operations comprising:
   receiving, by a transaction controller defining a data access layer of a database and via a plurality of application servers associated with a client interface, a plurality of requests to modify data stored in the database, the transaction controller comprising an application programming interface (API), the plurality of application servers comprising a first application server and a second application server, the plurality of requests comprising a first request and a second request, the first request received via the first application server and the second request received via the second application server, the first request and the second request forming a part of a single user operation, wherein the transaction controller and each of the plurality of application servers are connected via a virtual connection, and wherein the transaction controller and the database is connected via a physical connection;
   providing, by the API to each of the plurality of application servers via the virtual connection in response to each of the plurality of requests, a representation of the data, the representation of the data being provided at the data access layer of the database; and
   executing, by each of the plurality of application servers, each of the plurality of requests, the executing comprising modifying, via the virtual connection and by the transaction controller, the representation of the data without modifying the data stored in the database.

2. The system of claim 1, wherein the executing further comprises: committing, by each of the plurality of application servers, the modification to the representation of the data as a single transaction, the committing comprising modifying the data stored in the database.

3. The system of claim 1, wherein the executing further comprises: canceling, by each of the plurality of application servers, the modification to the representation of the data as a single transaction, the canceling comprising closing the virtual connection without modifying the data stored in the database.

4. The system of claim 1, wherein the representation of data is written, by the API, into a data table, and wherein the data table is provided, by the API, to each of the plurality of application servers.

5. The system of claim 1, wherein the operations further comprise:
- receiving by each of the plurality of application servers, a request to activate the transaction controller; and
- activating, by each of the plurality of application servers, the transaction controller as the data access layer on the database.

6. The system of claim 1, wherein the operations further comprise:
- determining, by the API, that the plurality of requests comprise a request to modify an amount of data that is greater than a threshold amount of data;
- creating, by the API, a local streaming copy of the data on the transaction controller; and
- streaming, by the API via the virtual connection, the local streaming copy of the data to each of the plurality of application servers.

7. A computer-implemented method, comprising:
- receiving, by a transaction controller defining a data access layer of a database and via a plurality of application servers associated with a client interface, a plurality of requests to modify data stored in the database, the transaction controller comprising an application programming interface (API), the plurality of application servers comprising a first application server and a second application server, the plurality of requests comprising a first request and a second request, the first request received via the first application server and the second request received via the second application server, the first request and the second request forming a part of a single user operation, wherein the transaction controller and each of the plurality of application servers are connected via a virtual connection, and wherein the transaction controller and the database is connected via a physical connection;
- providing, by the API to each of the plurality of application servers via the virtual connection in response to each of the plurality of requests, a representation of the data, the representation of the data being provided at the data access layer of the database; and
- executing, by each of the plurality of application servers, each of the plurality of requests, the executing comprising modifying, via the virtual connection and by the transaction controller, the representation of the data without modifying the data stored in the database.

8. The method of claim 7, wherein the executing further comprises: committing, by each of the plurality of application servers, the modification to the representation of the data as a single transaction, the committing comprising modifying the data stored in the database.

9. The method of claim 7, wherein the executing further comprises: canceling, by each of the plurality of application servers, the modification to the representation of the data as a single transaction, the canceling comprising closing the virtual connection without modifying the data stored in the database.

10. The method of claim 7, wherein the representation of data is written, by the API, into a data table, and wherein the data table is provided, by the API, to each of the plurality of application servers.

11. The method of claim 7, further comprising:
- receiving by each of the plurality of application servers, a request to activate the transaction controller; and
- activating, by each of the plurality of application servers, the transaction controller as the data access layer on the database.

12. The method of claim 7, further comprising:
- determining, by the API, that the plurality of requests comprise a request to modify an amount of data that is greater than a threshold amount of data;
- creating, by the API, a local streaming copy of the data on the transaction controller; and
- streaming, by the API via the virtual connection, the local streaming copy of the data to each of the plurality of application servers.

13. A non-transitory computer-readable medium storing instructions, which when executed by at least one data processor, result in operations comprising:
- receiving, by a transaction controller defining a data access layer of a database and via a plurality of application servers associated with a client interface, a plurality of requests to modify data stored in the database, the transaction controller comprising an application programming interface (API), the plurality of application servers comprising a first application server and a second application server, the plurality of requests comprising a first request and a second request, the first request received via the first application server and the second request received via the second application server, the first request and the second request forming a part of a single user operation, wherein the transaction controller and each of the plurality of application servers are connected via a virtual connection, and wherein the transaction controller and the database is connected via a physical connection;
- providing, by the API to each of the plurality of application servers via the virtual connection in response to each of the plurality of requests, a representation of the data, the representation of the data being provided at the data access layer of the database; and
- executing, by each of the plurality of application servers, each of the plurality of requests, the executing comprising modifying, via the virtual connection and by the transaction controller, the representation of the data without modifying the data stored in the database.

14. The non-transitory computer-readable medium of claim 13, wherein the executing further comprises: committing, by each of the plurality of application servers, the modification to the representation of the data as a single transaction, the committing comprising modifying the data stored in the database.

15. The non-transitory computer-readable medium of claim 13, wherein the executing further comprises: canceling, by each of the plurality of application servers, the modification to the representation of the data as a single transaction, the canceling comprising closing the virtual connection without modifying the data stored in the database.

16. The non-transitory computer-readable medium of claim 13, wherein the representation of data is written, by the API, into a data table, and wherein the data table is provided, by the API, to each of the plurality of application servers.

17. The non-transitory computer-readable medium of claim 13, wherein the operations further comprise:
   receiving by each of the plurality of application servers, a request to activate the transaction controller; and
   activating, by each of the plurality of application servers, the transaction controller as the data access layer on the database.

18. The non-transitory computer-readable medium of claim 13, wherein the operations further comprise:
   determining, by the API, that the plurality of requests comprise a request to modify an amount of data that is greater than a threshold amount of data;
   creating, by the API, a local streaming copy of the data on the transaction controller; and
   streaming, by the API via the virtual connection, the local streaming copy of the data to each of the plurality of application servers.

* * * * *